UNITED STATES PATENT OFFICE.

WILLIAM PAINTER, OF BALTIMORE, MARYLAND, ASSIGNOR TO THE CROWN CORK AND SEAL COMPANY, OF SAME PLACE.

GLUTEN COMPOUND.

SPECIFICATION forming part of Letters Patent No. 619,338, dated February 14, 1899.

Application filed January 14, 1898. Serial No. 666,664. (No specimens.)

*To all whom it may concern:*

Be it known that I, WILLIAM PAINTER, a citizen of the United States, residing at Baltimore, Maryland, have invented certain new and useful Improvements in Gluten Compounds, of which the following is a specification.

The primary object of my invention is the production of a composition of matter adapted to be used for various purposes where elasticity, compressibility, tenacity, uniformity of texture, flexibility, and insolubility in water are desirable; but I do not limit myself to any particular application of the composition.

My invention consists of a composition of matter comprising gluten, glycerin, and a body material, such as granulated or pulverized cork or other substances of a pulverulent, granular, fibro-granular, or fibrous nature.

In the production of gluten from wheat or other cereals the following properties of this substance are well known: First, as extracted in the wet state from substances containing it it is very tenacious and adhesive and is in that state practically insoluble in water, and, second, in its wet plastic state it quickly ferments, loses its tenacious and adhesive qualities, and becomes partially soluble and valueless for any purpose requiring insolubility in water. If, however, it be subjected to a process of desiccation either at atmospheric or higher temperatures before fermentation begins, it loses all tendency to ferment, and if carried to absolute dryness becomes hardened into a translucent substance resembling horn and becomes incapable of being again brought to a plastic state by immersion in water. Its insolubility and the tenacious and adhesive qualities which it possesses in the wet plastic state render it a desirable substance for many uses in the arts, providing these qualities can be maintained in a product containing it.

I have found that not only does mere desiccation at ordinary temperatures up to a certain condition of dryness produce in it such a change as precludes, when brought into contact with water, its return to the plastic condition which it assumes as extracted from substances containing it, but that subjecting it to temperatures of from 200° Fahrenheit upward has the effect to indurate it and render it less permeable to watery liquids in proportion as the temperature employed is high, up to that at which carbonization or decomposition begins, and somewhat in proportion to the period for which a given temperature is maintained.

I have also found that in drying the gluten from the original wet state by manipulating it under temperatures of about 200° Fahrenheit before or during incorporation of the glycerin or body material with it measurably the same indurating effect upon the gluten is produced as when subjected to heat after incorporation with the glycerin, body material, or both, and for some purposes one or both of these processes is employed.

I have found also that by combining gluten in the wet state with glycerin and then subjecting it to the above-described desiccating or indurating processes I can first dispel the water which it contained in the wet plastic state and then more or less indurate and render it less permeable to water, while retaining sufficient of the glycerin permanently combined therewith to impart to it such pliability or flexibility as may be essential to compounds containing it.

In preparing the composition I take the gluten in its plastic state and mix with it a proportion of glycerin. The body material is then added to the composition of gluten and glycerin and thoroughly incorporated therewith, after which the composition is rolled or molded into any form desired. I then subject the compound to heat at a temperature and for a time depending upon the hardness and elasticity desired in the finished product, or the gluten may be subjected to heat before or during incorporation, in either case producing that indurating effect upon the gluten which makes it in greater or less degree impermeable to water, proportional to the temperature at or the period during which it is subjected to heat.

In carrying out my invention I prefer to take the gluten in its plastic state and thoroughly mix the glycerin therewith, subsequently incorporating the body material, though I do not limit myself to this particular order, as the ingredients may be incorporated together in any desirable manner or order.

To prepare this product for some purposes, I use sixty-five (65%) per cent. of gluten in the plastic state, adding to this five (5%) per cent. of glycerin and thirty (30%) per cent. of ground cork, these proportions being by weight. After thorough incorporation I roll or mold the mass into the desired form, and in this form subject it for about seven hours to a temperature of about 212° Fahrenheit, or subject the gluten to similar temperature before or during incorporation, or in some cases resort to both processes.

What I claim is—

1. A compound of gluten, glycerin and a body material.

2. A compound of gluten, glycerin and a finely-divided body material.

3. A compound of gluten, glycerin and granulated or pulverized cork.

4. The method herein described consisting in incorporating with gluten in the plastic condition, glycerin and a granulated or pulverized body material, and subjecting the compound to heat.

In testimony whereof I affix my signature in presence of two witnesses.

WILLIAM PAINTER.

Witnesses:
JOHN T. HAWKINS,
W. H. WHEELER.